United States Patent [19]

Sharpe et al.

[11] Patent Number: 4,618,955
[45] Date of Patent: Oct. 21, 1986

[54] DIGITAL DATA TRANSMISSION SYSTEM

[75] Inventors: Anthony K. Sharpe, Teversham; Peter J. Mabey, Crawley, both of England

[73] Assignee: U.S. Philips Corporation, New York, N.Y.

[21] Appl. No.: 581,753

[22] Filed: Feb. 21, 1984

[30] Foreign Application Priority Data

Feb. 25, 1983 [GB] United Kingdom ................ 8305296

[51] Int. Cl.$^4$ ............................................. G06F 11/10
[52] U.S. Cl. ......................................... 371/37; 371/39
[58] Field of Search .............................. 371/37, 39, 40

[56] References Cited

U.S. PATENT DOCUMENTS

| 4,276,646 | 6/1981 | Haggard et al. | 371/37 |
| 4,416,010 | 11/1983 | Hibino et al. | 371/37 |
| 4,437,185 | 3/1984 | Sako et al. | 371/37 |
| 4,477,903 | 10/1984 | Schouhamer Immink | 371/37 |
| 4,497,058 | 1/1985 | Sako et al. | 371/37 |
| 4,498,175 | 2/1985 | Nagumo et al. | 371/37 |
| 4,523,323 | 6/1985 | Nakajima et al. | 371/37 |
| 4,525,838 | 6/1985 | Patel | 371/37 |

FOREIGN PATENT DOCUMENTS 2086106  5/1982  United Kingdom .

Primary Examiner—Michael R. Fleming
Attorney, Agent, or Firm—David R. Treacy

[57] ABSTRACT

In digitally encoded data transmission systems such as paging systems using a code word format, such as POCSAG, each code word includes a number of bits collectively termed the cyclic redundancy check bits. In a paging receiver the cyclic redundancy check bits are used to determine if there are errors in the received message code words. If an error is detected then one bit random error correction is generally applied because it has a more acceptable falsing rate compared to say two bit random error correction or four bit burst error correction. However a less acceptable falsing rate correction technique, such as four bit burst error correction, can be given if additional protection against falsing is provided. The additional protection comprises error detection check bits which are included in the entire message transmitted by the base station. At the receiver any errors in the message code words are subjected to four bit burst error correction and thereafter the entire "corrected" message is subjected to a further check using the error detection check bits. Whether or not error detection check bits have been included in the message is indicated by preconditioning the message, for example by using predetermined ones of the plurality of addresses allocated to each pager for different purposes. If error detection check bits have not been included a more acceptable falsing rate correction technique is applied.

18 Claims, 6 Drawing Figures

DIGITAL DATA TRANSMISSION SYSTEM

FIELD OF THE INVENTION

The present invention relates to a digital data transmission system in which message data is encoded in a block code format together with addressing data also encoded in such a manner. More particularly this present invention relates to text error correction in such a data transmission system.

BACKGROUND OF THE INVENTION

For convenience of description the present invention will be described with reference to the POCSAG (Post Office Code Standardisation Advisory Group) or CCIR No. 1 code format for use in digital radiopaging systems. However, the present invention is equally applicable to any similar data transmission system wherein message information is transmitted in code word format preceded by an addressing code word for destination identification, for example the Electronic Engineering Association (EEA) preferred data transmission system code.

The capabilities of complex digital codes, such as the POCSAG code, include the ability to perform some degree of error detection and, more importantly, some degree of error correction. The exact extent of these properties is a function of the particular code format in question. The POCSAG code, for instance, has a capability of detecting 11 bits in error if in a burst or 5 randomly distributed bits in error in each 32 bit code word and correcting up to two errors if randomly distributed within the 32 bit code word or up to 5 bit errors if grouped as a burst in any one code word.

The advantages in terms of improvement in code word decoding success rate introduced by the capability to correct bit errors in coded data are significant. However, such capabilities have drawbacks in that it becomes possible to incorrectly modify erroneous data to valid data if such erroneous data has a large number of errors, that is, more errors than the code is capable of correcting. This is an undesirable disadvantage.

For the POCSAG code, it is only possible to correct one bit error in each 32 bit code word and remain within the specification for falsely correcting code words. This limitation is undesirable.

SUMMARY OF THE INVENTION

It is the object of this invention to improve on the use of the error correcting capabilities of such codes.

According to the present invention there is provided a digital data transmission system comprising a base station having encoding means for encoding message data in accordance with a code word format which includes information bits and cyclic redundancy check bits, and at least one receiver having means responsive to the cyclic redundancy check bits being used by a receiver to determine the presence of errors in a received code word, and means for applying error correction on a code word by code word basis, wherein the base station further comprises means for including error detecting check bits within the information bits of the transmitted message to enable the receiver to detect false correction of erroneous data received.

By adding error detecting check bits to the message the receiver can apply a check to the entire message and determine whether the message, which may have been corrected, is true.

The error detecting check bits may not be added every time a message is transmitted by a base station and in order that a receiver may know that error detecting check bits have been added the message may be preconditioned in a suitable and convenient way. This may be done by assigning to the message a particular one of the alternative addresses allocated to the receiver or using one or more bits in the message part of the data signal to indicate the method of decoding to be used.

The receiver on detecting preconditioning of a message may apply a different error correction technique than that which is applied if a received message has not been pre-conditioned. In the former case the error correction technique may be more successful but have an unacceptable falsing rate, for example, 4-bit burst error correction, and in the latter case the error correction technique may be less successful but have an acceptable falsing rate, for example, 1-bit random error correction.

BRIEF DESCRIPTION OF THE DRAWINGS

The present invention will now be described, by way of example, with reference to the accompanying drawings, wherein.

DETAILED DESCRIPTION OF THE PREFERRED EMBODIMENT

Figure 1:
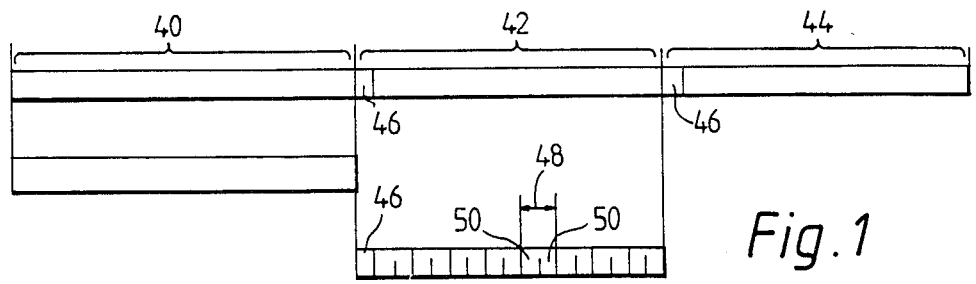
FIGS. 1 and 2 illustrate a code format for POCSAG pagers.
Figure 2:
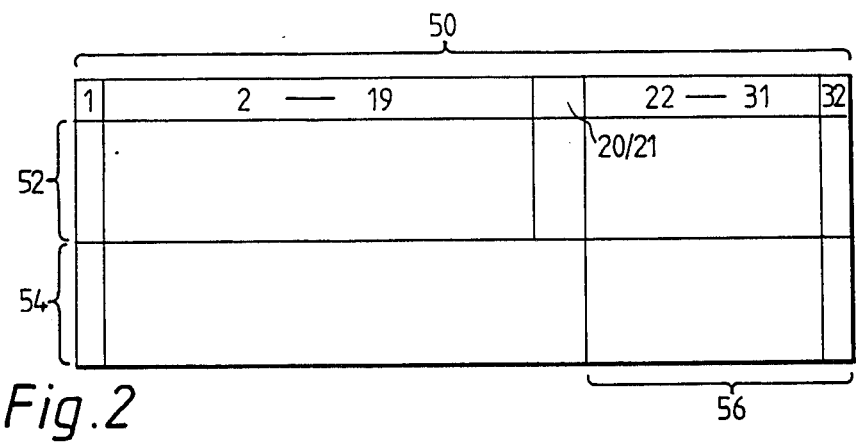

Referring to FIGS. 1 and 2 of the drawings, althouth the POCSAG code format is becoming widely known as the CCIR Radio-Paging Code No. 1, in order to understand the present invention the signal and code word formats of POCSAG will be described. FIG. 1 shows the signal format comprising a preamble 40 of at least 576 bits, which comprise alternate ones and zeroes, concatenated with a series of batches 42, 44, each of 544 bits. The preamble 40 has a duration corresponding to at least one batch plus a 32-bit code word. A batch comprises a 32-bit synchronisation code word 46 and eight frames 48, each frame comprising two 32-bit code words 50. Thus each batch 42, 44 is formed by seventeen code words 50 each of 32 bits.

The code format is a (31, 21) Bose-Chaudhuri-Hocquenghen (BCH) code with appended even parity bit, thus each code word 50 has twenty-one information bits. The first bit of a code word in the information field determines whether it is an address code word 52 because its value is zero or whether it is a message code word 54 because its value is one. In the case of an address, bits 2 to 19 are address bits corresponding to the eighteen most significant bits of a 21-bit identity assigned to the pager. The three least significant bits are not transmitted but serve to define in which of the eight frames 48 in a batch 42, 44 the address code word 50 must be transmitted. Bits 20 and 21 are the two function bits which are used to select one of four addresses assigned to the pager corresponding to each identity. Bits 22 to 31 are cyclic redundancy check bits and the final bit, bit 32, is chosen to give overall even parity.

The difference between the address and message code words is that in the case of a message code word 54 the bits 2 to 21 are the message itself. A number of message code words concatenated to an address code word are transmitted dependent upon the length of the complete message being sent. Each message code word displaces one address code word 52 (FIG. 2) and the displaced address code words will be delayed and transmitted in the next available appropriate frame. Although for a particular call message code words 54 may continue into the next batch, the normal batch structure, that is, sixteen code words preceded by a synchronisation code word, is maintained.

The pager decoder has the capability of error correction of address code words. Deterioration in falsing probability due to the application of error correction is not critical when considering the decoding of address code words. The fact that an address decoder is looking for four known addresses out of 8 million available within the POCSAG coding format, infers a degree of protection from this falsing problem. Such protection is not available with message code words because there is nothing against which to correlate them.

Figure 3:
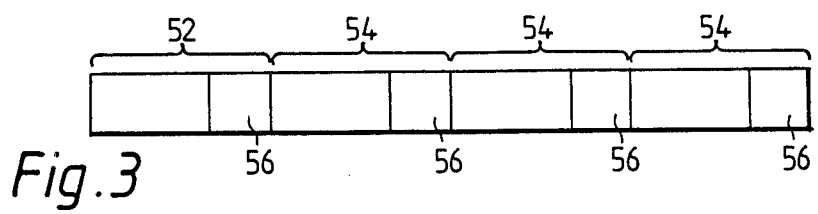
FIG. 3 illustrates an assembled message comprising address and message code words.

If a base station is to transmit a thirteen-character message then in accordance with a 4-bit hexa-decimal code it will be necessary to transmit $(4 \times 13 =)$ 52 bits as a message. In accordance with the form of a message code word 54 as shown in FIG. 2, each message code word will comprise five 4-bit characters, thus three successive code words will be required although only 12 bits of the third code word will be used. The remaining 8 bits will be redundant and could comprise two space characters of 4 bits each. FIG. 3 illustrates the composition of the entire signal. The first code word is an address one 52 and the next three are message code words 54. At the paging receiver, without some additional protection, the decoder will apply 1-bit random error correction only, because it has an acceptable falsing probability.

Figure 4:
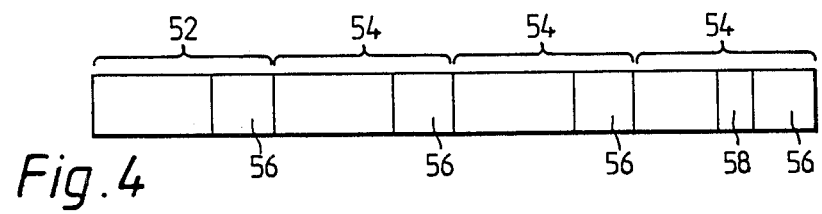
FIG. 4 illustrates an assembled message comprising address and message code words and added error detecting check bits.

Additional protection is provided by the method in accordance with the present invention by adding error detecting check bits 58 to the transmitted message, which also has an indication that these bits have been included. Conveniently in this example the error detecting check bits 58 (FIG. 4) comprise the equivalent of two 4-bit characters which in every way conform to the format of the POCSAG code and are transparent to the POCSAG code structure and which are appended to the end of the message within the final message code word. In the case of FIG. 4 the error detecting check bits 58 conveniently complete a code word by occupying the bit positions which would otherwise be taken by space characters. However, if less than 8 bits are unused in a message code word, an additional message code word must be appended if the error detecting check bits are to be transmitted. The addition of a subsequent message code word for transmitting the error detecting check bits is, dependent upon the overhead of such an addition being low, that is if the base station is transmitting idle code words, then an additional code word for the error detecting check bits is not significant. Therefore the overall calling rate of the base station is not affected. However, if the base station is busy, the error detecting check bits may be omitted and normal system operation would occur and a number of disadvantages would be introduced. The 8 error detecting check bits 58 must always be the last 8 of the information bits in the last message code word. Any spare information bits will be used as space characters. IF ASCII (7 bits) characters are used to form a message rather than 4-bit hexa-decimal, then the same format applies, that is the 8 error detecting check bits 58 must always be the last 8 of the information bits in the last message code word.

Prior to encoding, a complete string of information bits is created. Such a string is formed by subdividing the message characters to be transmitted into 20-bit blocks. If the message bits are not an integer number of 20-bit blocks, then the remaining bits of information are formed into a 20-bit block using "blank" characters. If the error detecting check bits are required, zeroes are substituted for the final 8 bits of the complete string. If message bits are contained within the final 8 bits of the string, then a further 20-bit block is created.

The error detecting check bits are derived by assembling the complete string of information bits and dividing it with a 9-bit generator polynomial, e.g. $x^8 + x^7 + x^6 + x^4 + x^3 + 1$. The 8-bit remainder of this division is then substituted for the 8 zeroes created in the final 20-bit block.

Figure 5:
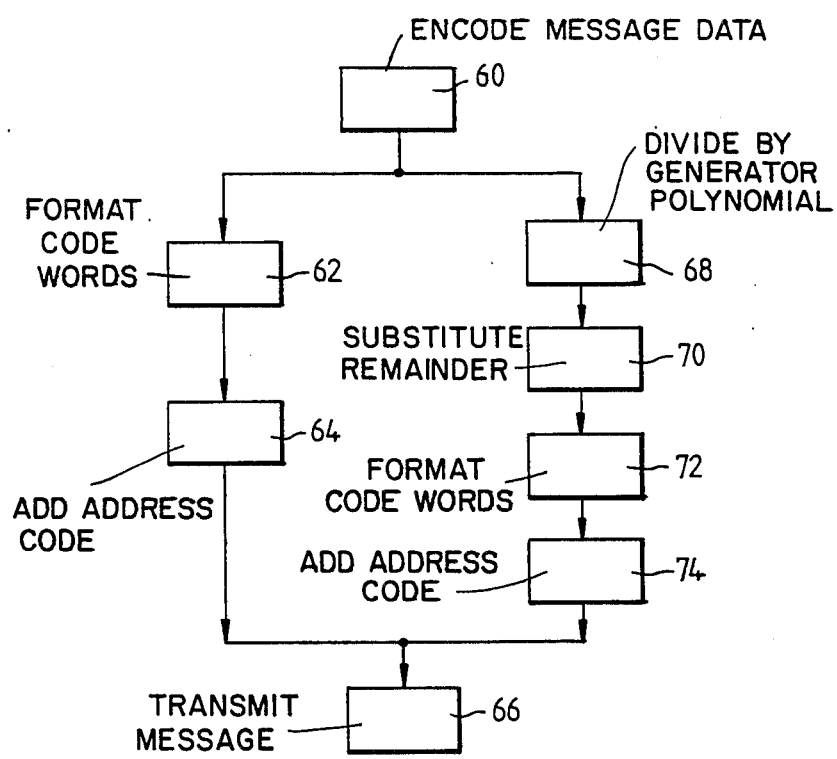
FIG. 5 is a flow chart explaining two alternative modes of operation in a base station.

FIG. 5 is a flow chart illustrating the various steps in preparing data for transmission from a base station. There may be situations where it is not desirable to add the error detecting check bits, for example, because the message is too short or the base station is operating in a busy period when time has to be allocated more effectively and the transmission of extra code words for improved success rate is not considered efficient. This is shown on the left side of the flow chart which shows the basic steps when the error detecting check bits are not added.

The step 60 is the encoding of the message data in accordance with, for example, a 4-bit hexadecimal code and creating blocks of 20 bits as described above. In the basic situation the message data is formatted into code words 54 of the type described with reference to FIGS. 1 and 2. This is the step 62. A flag of binary 1 is inserted at the most significant bit position of each block of 20 bits. Each group of 21 bits (the information field of a message code word) is formatted as a 32-bit code word according to the POCSAG structure by the deriviation of the cyclic redundancy check bits and final even parity bit. Such message code words are then concatenated in order. Step 64 denotes adding of one of the addresses of the paging receiver specified as the addressee of the message in the initial code word position, thus forming a call as specified in FIG. 3. As will be explained in greater detail later, it is desirable that different addresses be used for the sending of data with and without error detecting check bits. Step 66 denotes the transmission of the address in its appropriate frame 48 (FIG. 1) followed by the message code words concatenated accordingly.

In the case of adding error detecting check bits the steps comprise encoding the data, step 60. Then the complete string of information bits is assembled and divided by the 9-bit generator polynomial, step 68. Step 70 denotes substituting the 8-bit remainder of said division for the 8 zeroes in the final 20-bit block. Step 72 indicates the formatting of the entire message according to the POCSAG structure in the same way as in step 62 and accordingly this will not be described again. Step 74 denotes appending the appropriate address of the pager. Finally, the address and message are transmitted, step 66, as described above.

Figure 6:
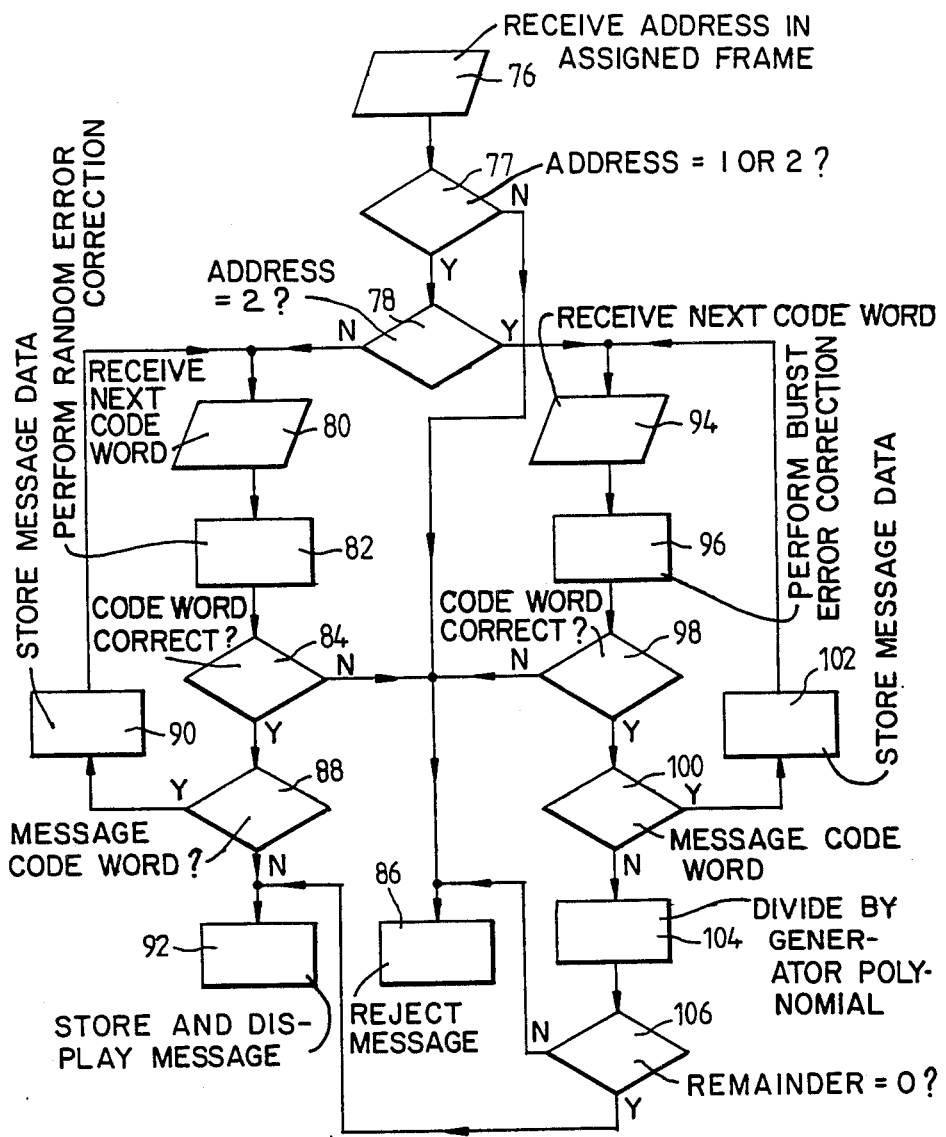
FIG. 6 is a flow chart explaining two alternative modes of operation in a paging receiver.

The steps in the operation of the paging receiver will now be described with reference to FIG. 6. For convenience in explaining the operation of the receiver it will be assumed that an "address 1" will be given to a message transmitted without error detecting check bits and an "address 2" will be given to a message transmitted with error detecting check bits. Also it will be assumed that the paging receiver is capable of receiving only these two addresses.

Step 76 denotes receiving an address code word in the assigned frame. Step 77 denotes checking if the address code word in the assigned frame is either "address 1" or "address 2". If the answer is no (N), then the entire message is rejected, step 86. However, if the answer is yes (Y), the next step 78 is to identify which of the addresses has been received. In this example the question "Is the address received "address 2"?" is inferred. Assuming the address to be "address 1" then the answer is "no", denoted by N in the Figure.

Step 80 denotes receiving a subsequent code word, either address or message, on which one-bit random error correction is performed by the operation 82. This operation is performed regardless of whether the code word contains errors or not since no data corruption will occur if there are no errors. The decision taken in 84 is to determine whether the code word as it now appears is correct. If the code word was not successfully decoded, then the route denoted N is taken and the complete message is rejected at step 86. However, if the code word is now correct, the route "Y" is taken, whereupon the question "Is the code word a message cord word?" is asked. If the answer is "yes" (Y), then the code word data, 20 bits, is stored by the operation 90, whereupon the paging receiver returns to await the input of another code word. If at the decision stage 88 an address code word (including an idle code word) is received, the end of the message is deemed to have occurred. At this time the complete message comprising multiples of blocks of 20 bits is stored within the paging receiver and can be displayed in operation 92, whereupon the paging receiver returns to expect reception of its own address code word—either "address 1" or "address 2".

Returning to step 78, if the decision deems that "address 2" has been received, then the route "yes" is taken (Y) and the operation 94 will be next performed. Operation 94 is identical to operation 80 wherein the paging receiver awaits reception of a subsequent code word. In this case when the code word has been received, a 4-bit burst error correction process is performed in step 96. This operation is performed regardless of whether any errors are present in the code word since no corruption of valid data will occur. After the correction process the decision in step 98 deems whether the code word is now correct. If it is not (N), the complete message is rejected at step 86. If the code word is now deemed correct, the Y exit from decision block 98 is taken, whereupon the decision 100 deems whether the received code word was a message code word (most significant bit=1) or an address code word (most significant bit=0). For message code words the Y route is taken and the message data, 20 bits, is stored in operation 102, whereupon the paging receiver returns to operation 94 to await the next code word input. If the code word received is an address code word, the decision 100 will exit via route N, where the message is deemed to be completed because an address code word terminates a message. The operation 104 divides the complete received message, a number of blocks of 20 bits, by the 9-bit generator polynomial in order to determine overall validity of the received data. Step 106 determines whether corruption of the message code words has occurred and that the POCSAG code was not able to detect them by asking the question "Is the division remainder=0?". If "yes" (Y) the complete message is accepted and displayed, operation 92. If the remainder does not equal 0, then step 106 exits at N and performs operation 86 wherein the complete message is rejected as before.

In the case of a paging system having simple, basic paging receivers only able to apply steps 80 to 92 and more sophisticated paging receivers which are able to apply steps 80 to 106, then the types of paging receivers and their respective groups of addresses are stored on a computer at the base station. Thus in the case of a call being made to a basic type of paging receiver, then the computer will know from the address not to add the error detecting check bits. In the case of calling a more sophisticated paging receiver and assuming that unallocated bits exist within a message code word, or that the message is long and the addition of a further code word causes little deterioration in the calling rate, the computer will include the error detecting check bits in the message and send it with "address 2". Alternatively, if the message is short and/or it is a busy period, the computer will omit the error detecting check bits and send the message with "address 1".

Thus, not only will the paging receiver be able to overcome the drawback of a deteriorating falsing rate with a higher than one-bit random error correction technique but also by providing an indication that the error detecting check bits are being transmitted, it knows the most effective way to handle the message to optimize on call success rate and on paging call rate.

Although the present invention has been described with reference to the POCSAG format, it can be used with other formats, such as Golay Sequential Code or the EEA code mentioned previously, wherein each code word contains cyclic redundancy check bits. Additionally, although preconditioning of a message can be indicated by giving the message a particular one of the addresses assigned to a paging receiver, an alternative way would be to insert bits at selected positions(s) in each code word of an encoded message, which bits are indicative of the method of decoding to be used.

We claim:

1. A digital data transmission system comprising a base station having encoding means for encoding message data in accordance with a code word format which includes information bits and cyclic redundancy check bits, and means for transmitting said encoded message, and a receiver having means for receiving said encoded and transmitted message, means responsive to said cyclic redundancy check bits to determine the presence of errors in a received code word, and means for applying error correction on a code word by code word basis, wherein said base station further comprises means for deriving a predetermined number of error detecting check bits by assembling a complete string of said information bits, dividing said string by an n-bit generator polynomial, n being an interger, and forming the (n−1) bit remainder of this division, and means for substituting said error detecting check bits for an equal number of the information bits of said transmitted message and said receiver further comprises means to detect false correction of erroneous data received.

2. A system as claimed in claim 1, wherein the error detecting check bits are encoded by said encoding means to have the same format as the encoded message data and said base station further includes means for preconditioning a message such that the message includes the error detecting check bits, and the receiver has means to detect the preconditioning of the message and for carrying out an additional check to detect false correction on erroneous data received.

3. A system as claimed in claim 2, wherein said receiver further includes means responsive to the detection of the preconditioned message for applying an error correction technique different from that which is applied if a received message has not been preconditioned.

4. A system as claimed in claim 3, wherein said error correction means applies a first falsing rate error correction if the received signal has been preconditioned and a second falsing rate error correction if the received signal has not been preconditioned.

5. A system as claimed in claim 4, whrein the first error correction is 4-bit burst error correction and the second error correction is 1-bit random error correction.

6. A system as claimed in claim 4, wherein said first rate is an unacceptable rate, and said second rate is an acceptable rate.

7. A system as claimed in claim 2, wherein the means for preconditioning a message applied an address different from that applied when no error detecting check bits are to be included.

8. A system as claimed in claim 2, wherein the means for preconditioning a message comprises inserting bits at selected position(s) in at least one code word of an encoded message, which bits are indicative of the method of decoding to be used.

9. A system as claimed in claim 1 wherein the code format is POCSAG.

10. A digital data transmission system comprising a base station having encoding means for encoding message data in accordance with a code word format which includes information bits and cyclic redundancy check bits, and means for transmitting said encoded message, and a receiver having means for receiving said encoded and transmitted message, means responsive to said cyclic redundancy check bits to determine the presence of errors in a received code word, and means for applying error correction on a code word by code word basis, wherein said base station further comprises means for deriving a predetermined number of error detecting check bits and means for substituting said error detecting check bits for an equal number of the information bits of said transmitted message and said receiver further comprises means to detect false correction of erroneous data received.

11. A system as claimed in claim 10, wherein the error detecting check bits are encoded by said encoding means to have the same format as the encoded message data and said base station further included means for preconditioning a message such that the message includes the error detecting check bits, and the receiver has means to detect the preconditioning of the message and for carrying out an additional check to detect false correction on erroneous data received.

12. A system as claimed in claim 11, wherein said receiver further includes means responsive to the detection of the preconditioned message for applying an error correction technique different from that which is applied if a received message has not been preconditioned.

13. A system as claimed in claim 12, wherein said error correction means applies a first falsing rate error correction if the received signal has been preconditioned and a second falsing rate error correction if the received signal has not been preconditioned.

14. A system as claimed in claim 13, wherein said first rate is an unacceptable rate, and said second rate is an acceptable rate.

15. A system as claimed in claim 14, wherein the first error correction is 4-bit burst error correction and the second error correction is 1-bit random error correction.

16. A system as claimed in claim 13, wherein the first error correction is 4-bit burst error correction and the second error correction is 1-bit random error correction.

17. A system as claimed in claim 11, wherein the means for preconditioning a message applies an address different from that applied when no error detecting check bits are to be included.

18. A system as claimed in claim 11, wherein the means for preconditioning a message comprises inserting bits at selected position(s) in at least one code word of an encoded message, which bits are indicative of the method of decoding to be used.

* * * * *